(12) United States Patent
Brown et al.

(10) Patent No.: US 6,751,217 B1
(45) Date of Patent: Jun. 15, 2004

(54) COMBINED SELECTOR SWITCH AND SERIAL MULTI-GB/S DATA PULSE RECEIVER

(75) Inventors: Anthony D. Brown, Kanata (CA); Paparao Palacharla, Nepean (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/412,609

(22) Filed: Oct. 6, 1999

(51) Int. Cl.[7] .............................. H04Q 11/00; H04J 3/02
(52) U.S. Cl. ...................... 370/359; 370/366; 370/537
(58) Field of Search ................................ 370/357, 359, 370/360, 366, 388, 422, 423, 537, 540, 541

(56) References Cited

U.S. PATENT DOCUMENTS

| | | | |
|---|---|---|---|
| 4,197,428 A | 4/1980 | Semur et al. ................. | 179/18 |
| 4,430,732 A | 2/1984 | Saga et al. .................... | 370/54 |
| 4,443,773 A | 4/1984 | Rall et al. .................... | 333/104 |
| 5,200,647 A * | 4/1993 | Motoike ....................... | 327/403 |
| 5,432,486 A | 7/1995 | Wong ........................... | 333/109 |
| 5,638,402 A * | 6/1997 | Osaka et al. ................. | 375/257 |
| 5,852,637 A * | 12/1998 | Brown et al. ................ | 375/316 |
| 6,038,229 A * | 3/2000 | Cooperman .................. | 370/388 |
| 6,118,781 A * | 9/2000 | Sekine ......................... | 370/360 |
| 6,144,660 A * | 11/2000 | Torma ......................... | 370/380 |
| 6,295,282 B1 * | 9/2001 | Buer et al. ................... | 370/323 |
| 6,418,142 B1 * | 7/2002 | Wolf ............................ | 370/390 |
| 6,477,186 B1 * | 11/2002 | Nakura et al. ............... | 370/537 |

* cited by examiner

*Primary Examiner*—Hassan Kizou
*Assistant Examiner*—Timothy Lee

(57) ABSTRACT

A bit line selector switch is serially connected with a data sink for detecting high speed data transmissions, typically in the gigabit-per-second range, and a backplane having a plurality of data lines. The selector switch incorporates a selector circuit that operates in one of two modes, a first "selected", or ON, mode and a second "not selected", or OFF, mode. The selector circuit includes one, preferably differential, input. In one embodiment, a selector switch has a plurality of selector circuits thus allowing the switch to operate in both modes simultaneously. Data coupled to a differential input of the selector circuit will, when operating in the "selected" or ON mode, transmit the data to the data sink which be, for example, a memory device, processor, or the like. In the "not selected" or OFF mode, the selector circuit will pass any data received to a positive supply rail. Regardless of the mode of operation, the selector circuit presents to the coupled data lines an impedance which matches that of the data path coupling the selector circuit to the data line. The selector switch, which typically is comprised of four or less differential inputs, and thus a corresponding number of selector circuits, may be combined with other similar switches to form a multistage switch.

14 Claims, 4 Drawing Sheets

COMBINED SELECTOR SWITCH AND SERIAL MULTI-GB/S DATA PULSE RECEIVER

FIELD OF THE INVENTION

The invention relates to a selector switch which may be configured as a distributed crossbar switch with redundancy or used to detect serial data at gigabit-per-second (Gb/s) rates from a selected one of a plurality of data lines.

BACKGROUND TO THE INVENTION

With the advent of the dawn of the Information Highway and the explosion of telecommunications, the quantity and speed of data transmission continues to grow. In the telecommunications industry, as well as in the computer industry, there exists a need to transmit large quantities of data from point to point such as, for example, between memory and processors in a multi-processor computer. The large number of data bits coupled with the large number of connections create an interconnect bottleneck which requires large numbers of data drivers necessitating a large amount of electrical power. To overcome this interconnect congestion large numbers of parallel bit streams can be multiplexed to higher rate serial bit streams, thus reducing the number of electrical connections that need to be made. The need for low power multiplex and demultiplex circuits capable of combining data signals at high transmission rates, from 50 Mb/s to 1 Gb/s for example, has attracted a number of commercial integrated circuit vendors. Nevertheless, the computer and communications industry continues to search for lower power solutions.

A technique that has been employed with some success to reduce the number of interconnections in communications switching equipment is the employment of contactless, or non-contact, backplanes (the backplanes being sets of data lines). Non-contact backplanes permit point-to-multipoint and multipoint-to-point data transmission over a passive backplane without loss of signal integrity due to the multipoint connections. With this technique, distribution of multi-Gb/s serial data is achieved through a form of AC coupling of such small proportions that the data information is contained in the data transitions. It is not uncommon for the received data at the demultiplex circuit to be considerably attenuated by using this technique. Signal levels of only 70 mV peak to peak, or even less, are not uncommon. Reliable reception of the data requires special techniques including signal amplification, wide frequency bandwidth, matched input impedance and some form of hysteresis to discriminate against unwanted noise signals. Moreover, the resultant signal may need to be restored to Non-Return to Zero (NRZ) format from a Return to Zero (RZ) format. A receiver capable of such techniques is disclosed in U.S. Pat. No. 5,852,637 issued on Dec. 22, 1998 to Brown et al; U.S. patent application Ser. No. 09/054,440 filed Apr. 3, 1998 for "A Multi-Gb/s Data Pulse Receiver"; U.S. patent application Ser. No. 09/071,117 filed on May 4, 1998 for "Method and Apparatus for Performing Data Pulse Detection"; and U.S. patent application Ser. No. 09/238,893 filed on Jan. 28, 1999 for "Data Pulse Receiver", the contents of each of which are hereby incorporated herein by reference.

The application of a multi-Gb/s data pulse receiver (a "MGDP Receiver") to enable the reception of RZ (return to zero) pulses from the AC couplers of the contactless backplane has permitted the performance of reliable point to multipoint distribution of high speed data buses in the Gb/s range. The AC coupling technique is based on directional coupling principles wherein data transfer occurs between proximate conductors. An example of one such coupling connector is described in U.S. Pat. No. 5,432,486 which issued Jul. 11, 1995 to Wong and assigned to Northern Telecom Limited. Typical bit error rate measurements per data line have been estimated to be as low as $10^{-21}$.

However, a problem with known non-contact backplane distribution systems is that they are limited to providing point to multipoint and multipoint to point applications and do not provide switching or redundancy.

We have recognised that it would be desirable to combine a non-contact backplane distribution system with a selector switch for selecting a data line from a plurality of data lines (hereinafter a "bit line selector switch" or "switch"). The result would be a distributed crossbar switch with redundancy (i.e. no central switch fabric) that provides multicast and linear growth capabilities. However, current bit line selector switches are ill-suited for use in such a distributed cross-bar switch as they cause spurious reflections at the interface with the data lines. These reflections would lower the signal integrity and also limit the multicast ability of the cross-bar switch as the reflections induced by the bit line selector switch will corrupt the signals transmitted on the plurality of data lines affecting other receivers downstream.

SUMMARY OF THE INVENTION

The present invention relates to a bit line selector switch connected to a backplane to form a distributed crossbar switch. The cross-bar switch, which has no central switch fabric, provides redundancy and multicast and linear growth capability.

A selector switch is in non-contact communication, via a form of AC coupling, with at least one of the data lines forming the backplane. In an alternative embodiment, the selector switch is in non-contact communication with several of the data lines forming the backplane. The selector switch may also be combined with a converter for converting an RZ signal to the NRZ format prior to the transmission of the data pulse to a data sink such as, for example, a memory device, another processor, or the like (in which case the data sink does not effect this conversion).

The selector switch presents to an incoming signal, that is, a data pulse, an impedance that matches that of the input data line regardless of whether or not the data line input to the selector switch is to be selected. This impedance matching is accomplished by having two modes of operation of the selector switch. These two modes of operation may be enabled by connecting a resistor, which matches the impedance of the input data line, connected to two grounded base amplifiers, in parallel with each other, whose emitters are both connected to the other end of the resistor. If the input to the selector switch is a differential input, this resistor and parallel amplifier configuration is repeated for each side of the differential input.

In the first mode of operation, the OFF or "not selected" mode, a data line is not selected for reception and transmission of the data pulse to the data sink. In this mode of operation, the signal is transmitted first through the resistor and then into one of the grounded base amplifiers which will have its collector connected to a positive power supply. In this way, any signals received in this mode will be ignored by the system.

In the second mode of operation, the ON or "selected" mode, a data line is selected for reception and transmission to, if incorporated, the RZ to NRZ converter, and then the data sink. In this mode an incoming signal is transmitted first through the resistor and then through the other grounded based amplifier to the converter, if incorporated, then to the data sink.

The selector switch's mode may be dependent upon the reference bias voltages applied to the base of the amplifiers. In the first mode of operation the bias voltage applied to the amplifier connected to the positive supply is higher than that of the second bias voltage applied to the base of the second amplifier. In the second mode of operation the opposite is true.

According to one aspect of the invention there is provided a combined bit line selector switch and data pulse receiving system comprising: a plurality of data lines for the propagation of data pulses; and a bit line selector switch interconnecting the plurality of data lines and the receiver. The bit line selector switch comprises: switch inputs in non-contact communication with the plurality of data lines by a plurality of data line interconnects; and a switch output in communication with the receiver. For each of the switch inputs there is a selector circuit between each of the switch inputs and the switch output which have a first mode of operation wherein data pulses detected by the selector circuit are blocked and a second mode wherein the data pulses detected by the selector circuit are transmitted; and the at least one input selector circuit matching the impedance of the data line interconnect in either the first or the second modes.

Another aspect of the invention is a crossbar switch comprising: N data lines for propagation of data pulses; a receiver receiving the data pulses; a bit line selector system in non-contact communication with each of the N data lines so as to interconnect the receiver and the data coupling lines. The bit line selector system is operable to transmit the data pulses from a selected one of the N data lines to the receiver and to simultaneously block data pulses on the remaining N−1 data lines. The bit line selector system has N inputs corresponding to the N data coupling lines and an output in communication with the receiver. Moreover, the selector system matches the impedance of said N data coupling lines.

The selector system of this crossbar may be comprised of several stages, each stage being comprised of at least one selector switch in communication with another stage which is also comprised of at least one selector switch. Each selector switch of the selector system is in non-contact communication with either the backplane or with selector switches of another stage. Each of the selector switches in this staged crossbar switch operate in either of the two modes described above and have the same impedance matching characteristic.

Another aspect of the invention is a method of selecting one of a plurality of high throughput data lines comprising: inputting data pulses received on a selector switch which is coupled to the plurality of data lines; selecting, in a first mode of operation of the selector switch, one of the data lines and transmitting the data pulses received by the selector switch on the selected data line to a receiver; in a second mode of operation of the selector switch transmitting data pulses from the non-selected data lines to a positive supply; and matching the impedance of input lines into the selector switch in either said first or said second modes of operation.

Another aspect of the invention is a selector switch comprising: an input in communication with a data line; an output; and a selector circuit interconnecting the input to the output. The selector circuit is operable in a first mode to transmit data pulses received at the input from the data line to the output and operable in a second mode to discard data pulses received at the input from the data line. The selector circuit also matches the impedance of the data line in the first and the second modes of operation.

Other aspects and features of the present invention will become apparent to those ordinarily skilled in the art upon review of the following description of a specific embodiment of the invention in conjunction with the accompanying figures.

BRIEF DESCRIPTION OF THE DRAWINGS

The present invention will be more clearly understood after reference to the following detailed specification read in conjunction with the drawings wherein.

DETAILED DESCRIPTION OF THE PREFERRED EMBODIMENTS

To avoid deleterious reflections in an arrangement with a bit line selector switch located physically between backplane microwave couplers and a data sink requires that the data path between backplane microwave couplers and the data sink, such as, for a example, a memory device (such as random access memory, fixed or removable storage devices, processors, or the like) receiving selected data pulses have some form of transmission line with a typical characteristic impedance of, for example, 50Ω. Such a physical arrangement would require that this data path be terminated by the selector switch with a well matched termination impedance. Indeed, the characteristic impedance of the selector switch must match that of the data path whether the switch is ON or OFF; also, the parasitic capacitance of the selector switch must be low enough so as to not impair the matched impedance and so cause spurious energy reflections in the data path. If the selector switch, in the OFF position, does not terminate the data path with the data path's characteristic impedance, the selector switch will cause spurious energy to be reflected back to the contactless backplane thus lowering the backplane's signal integrity.

Figure 1:
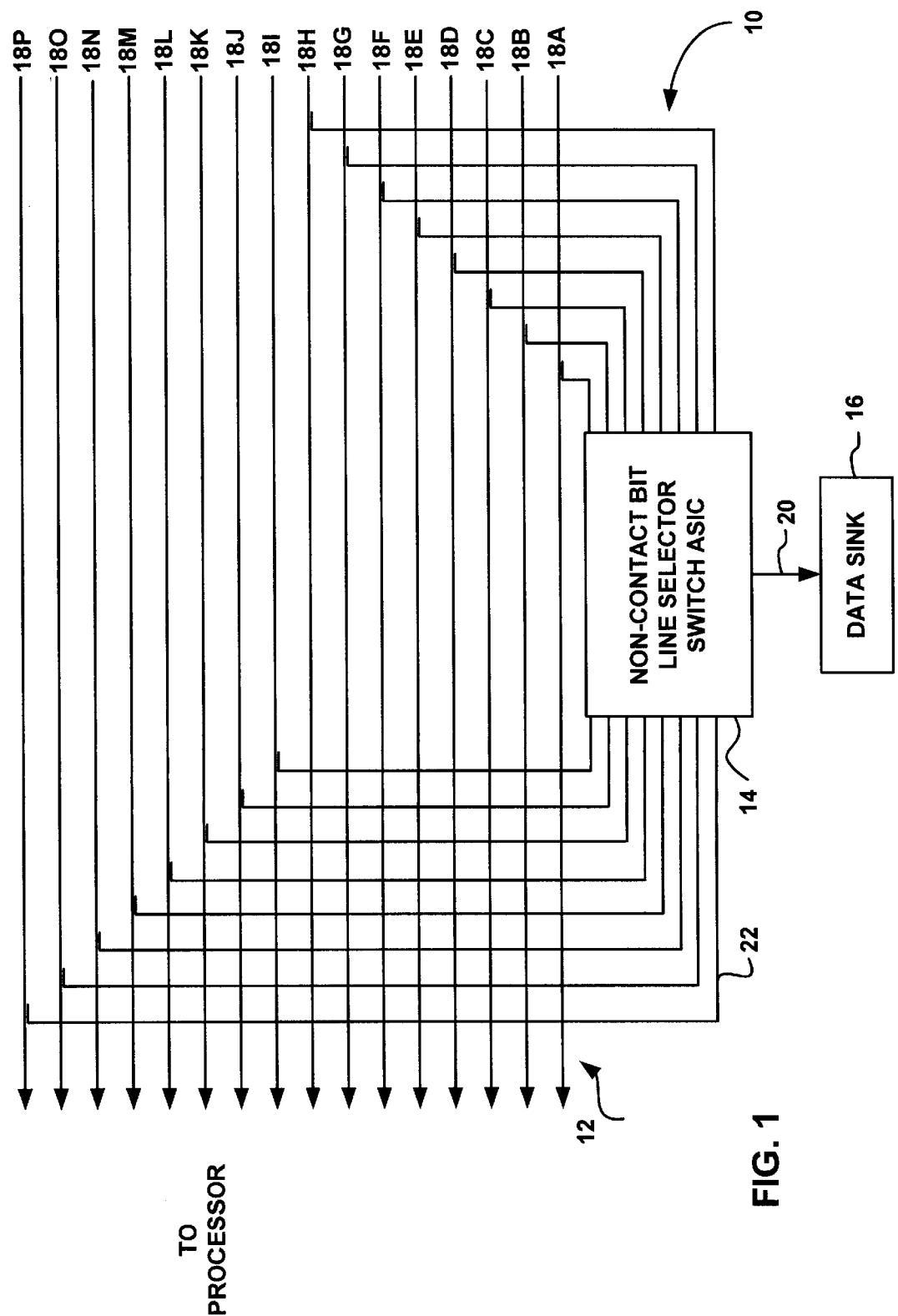
FIG. 1 is schematic of a signal transmission and receiving system in accordance with one embodiment of the invention.

Referencing FIG. 1, a selector switch system 10 for detecting and selecting serial multi-Gb/s data pulses is illustrated. As illustrated, combination system 10 is comprised of a data pulse data sink 16, which may be, for a example, a memory device (such as random access memory, fixed or removable storage devices) processors, or the like, in communication with a backplane 12 via a non-contact bit line selector switch Application Specific Integrated Circuit (ASIC) 14. Backplane 12 has a plurality of, as illustrated sixteen, data lines 18A–18P (generally referred to as data lines 18). Selector switch ASIC 14 is in communication with each of data lines 18 by a plurality of data line interconnects, which may be microwave couplers 22. As illustrated, and, for exemplary purposes only, system 10 allows for communication between a plurality of processors (not shown) connected to backplane 12 and data sink 16 connected to selector switch ASIC 14 via data communication path 20.

In operation of system 10, data propagates from a, or a plurality of, processor(s) (not shown) through data lines 18 of backplane 12. By operation of selector switch ASIC 14, data is received from a data line 18 selected by selector switch ASIC 14, through a form of AC coupling of data lines 18 and couplers 22, and transmitted to data sink 16 over data path 20.

Figure 2:
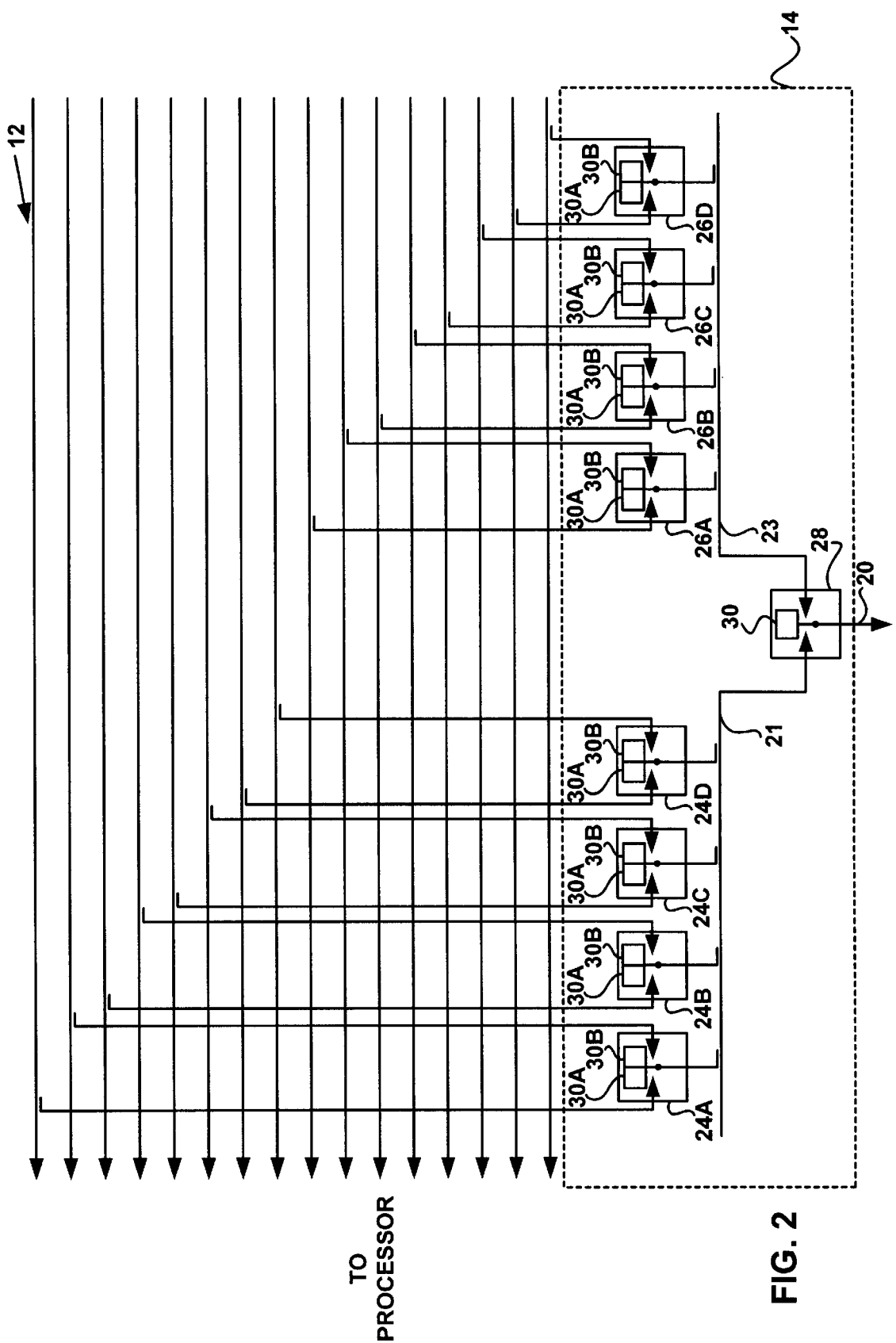
FIG. 2 is a schematic detail of a portion of FIG. 1.

With reference to FIG. 2, selector switch ASIC 14 is shown in further detail as being comprised of a plurality of selectable input switches 24A–24D (collectively, first selector switches 24), 26A–26D (collectively, second selector switches 26) on a first switching stage, and 28 on a second switching stage. Each of selectable input switches 24, 26 and 28 incorporate impedance matching circuitry in the form of selectable input circuit 30A, 30B. In the exemplary embodiment a central, or second stage, selector switch 28 is connected to two 4:1 multipoint-to-point input non-contact buses 21 and 23. In non-contact communication with non-contact bus 21 are four selector switches 24A, 24B, 24C and 24D which are identical to selector switch 28. Similarly, in non-contact communication with non-contact bus 23 are four selector switches 26A, 26B, 26C and 26D which are also individually equivalent to selector switch 28. As noted above, each of the four first selector switches 24 and the four second selector switches 26 are in non-contact communication with backplane 12.

In the configuration illustrated in FIG. 2, which is only exemplary of one embodiment of the invention, the interaction of selector switch 28 with selector switches 24 and 26 permits the selection of one of the sixteen data lines 18 thus forming a crossbar switch.

The exemplary embodiment of FIG. 2 is illustrated as having two cascading stages of selector switches (one stage formed by switches 24 and 26, and the other stage formed by switch 28). However, as will be obvious to those skilled in the art, the impedance matching ability of these selector switches enables the addition of further stages of cascaded switches since reflections caused by the switches have been reduced. The addition of additional switches, either on an existing stage, or by the addition of a further stage of switches, provides for growth and, through the multiplexing of a multiple switches and/or stages of switches, the system 10 (FIG. 1) provides for multicast capability.

Figure 3:
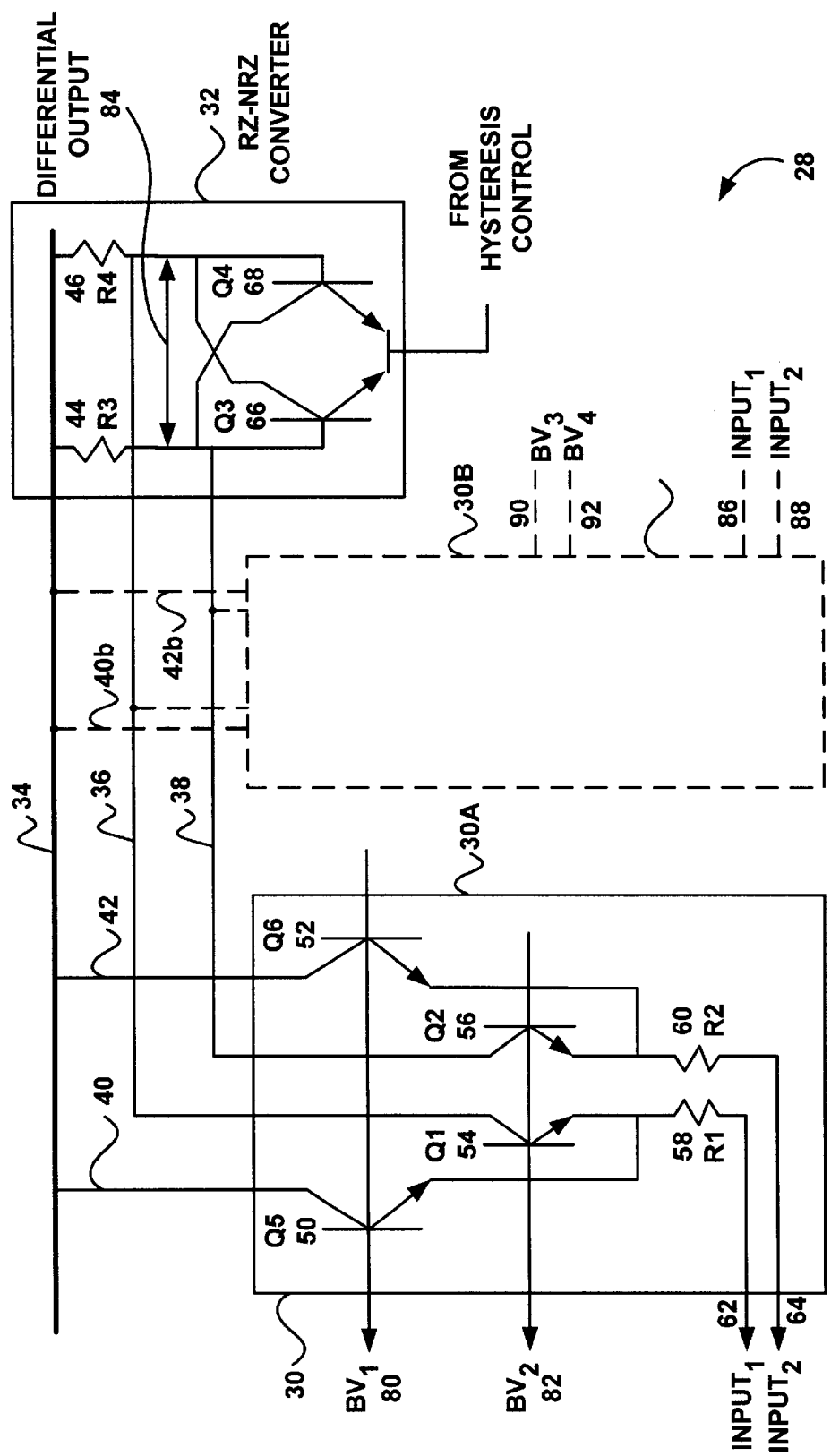
FIG. 3 is a schematic detail of a portion of FIG. 1.

Referencing FIG. 3, selector switch 28 is illustrated in detail. As noted above, selector switches 24 and 26 are identical to selector switch 28. Selector switch 28 comprises a selectable input circuit 30A connected via outputs 36, 38 to RZ to NRZ converter 32. Selectable input circuit 30A operates, as described below, to preferably match the impedance of one of input non-contact buses 21 and 23 (FIG. 2). Similarly, selectable input circuits 30A of selector switches 24, 26 operate to preferably match the impedance, in all modes of operation, of data lines 18.

Selectable input circuit 30A is also connected to a positive supply rail 34 by paths 40 and 42. RZ to NRZ converter 32 is also in communication with a hysteresis control circuit (not shown), such as, for example, the hysteresis control circuit disclosed in the cited and incorporated references.

Selectable input circuit 30A is comprised of differential inputs $input_1$ 62 and $input_2$ 64 in series with terminating resistors R1, 58, and R2, 60, respectively. Although a differential input, such as differential inputs 62 and 64 for is preferably an alternative embodiment using non-differential inputs could be used. However, the use of non-differential inputs may impact performance of the circuit. Inputs 62, 64 of selectable input circuit 30A are in communication with one of non-contact buses, such as, for example, non-contact bus 21. Terminating resistors R1 58 and R2 60 are connected in series with grounded base amplifier transistors Q1 54, and Q2 56, respectively, which in turn are connected to outputs 36 and 38, respectively. Connected in parallel with grounded base amplifiers Q1, Q2, 54, 56, respectively, are transistors Q5, 50, and Q6, 52, respectively, which are connected to power supply rail 34. Applied to the base of transistors 50 and 52 is bias control $voltage_1$ 80. Similarly, applied to the base of grounded base amplifiers Q1 54 and Q2 56 is bias control $voltage_2$ 82. Suitable properties of these components are described in detail in U.S. Pat. No. 5,852,637 incorporated herein Selectable input circuit 30B, shown in dotted outline and constructed in the same manner as selectable input circuit 30A, is required to select between the other of non-contact buses 21 and 23, which, in the above example, would be non-contact bus 23. Selectable input circuit 30B, is also connected to power rail 34 via paths 40B and 42B, and to RZ to NRZ converter 32 via outputs 36, 38, and has inputs 86, 88 and bias control voltage $(BV_3)$ 90 and bias control voltage $(BV_4)$ 92.

RZ to NRZ converter 32 is comprised of a flip-flop itself comprised of transistors Q3 66 and Q4 68 which are in communication with a suitable hysteresis control circuit (not shown). Transistors 66 and 68 are also connected to power supply rail 34 via terminating resistors R3 44 and R4 46. Output 84 of selectable switch 28 is the differential voltage measured across the data lines connecting transistors Q3 66 and Q4 68 to resistors R3 44 and R4 46 and the output is transmitted to data sink 16 via data path 20 (FIG. 1). Data sink 16, upon receipt of a data pulse transmitted from converter 32, operates in a conventional manner.

As noted above, for a selector switch, such as selector switch 28, to properly operate when serially interposed between a microwave coupler, such as coupler 22, and data sink 16, the selector switch preferably matches the termination impedance of data path 20. This requirement is satisfied by input matching impedance terminating resistors R1 58 and R2 60.

Referencing FIGS. 2 and 3, the selector switch 28 may select one of two separate inputs, such as non-contact buses 21 and 23, by the suitable operation of selectable input circuits 30A and 30B. As illustrated in FIG. 3, selector switch 28 is comprised of two selectable input circuits 30A and 30B. However, the number of selector circuits that may form part of selector switch 28 is theoretically unlimited but, for practical considerations, may be limited to four. The choice of four pairs of differential inputs (and thus four selectable input circuits) to a module incorporating selector switch 28 is suggested by the combined capacitive loading of the four input circuits at the juncture of the RZ to NRZ conversion flip-flop. Additional pairs of differential inputs may overly attenuate the minute signal current pulses at this juncture. Moreover, when using flip-chip packaging, the physical location of the four input circuits can be located on all four sides of the RZ to NRZ conversion flip-flop thus keeping the path delays from all four inputs identical and minimal. The minimal delay is important in the context of subsequent clock/data timing alignment.

Selectable input circuit 30A effectively has two modes of operation: a "not selected" (or OFF) mode and a "selected" (or ON) mode. In the "not selected" mode, selectable input circuit 30A will have bias control $voltage_1$ 80, which is applied to the base of transistors Q5 50, and Q6 52 being greater than the reference bias $voltage_2$ 82, which is applied to grounded base amplifier transistors Q1 54 and Q2 56 (i.e. $BV_1 > BV_2$). In this "not selected" mode, a data pulse current received via input resistors R1 58 and R2 60 will be steered to the positive supply rail 34 via transistors Q5 50 and Q6

52 on paths 40 and 42. To effectively accomplish this steering, the difference between bias control voltage$_1$ 80 and bias control voltage$_2$ 82 may be as small as 200 mV in practice. There is, therefore, no excessive current in resistors R1 58 and R2 60 during the "not selected" mode. Further, when selectable input circuit 30A is operating in the "not selected" mode, any input energy appearing at the emitters of transistors Q1 54 and Q2 56 is not transferred to the collectors of Q1 54 and Q2 56 since the bases (i.e. emitter base diodes) of these transistors are biased below the turn-on threshold. Instead, in the "not selected" mode any input data current passes through transistors Q5 50 and Q6 52 to supply rail 34. Further, when operating in the "not-selected mode", energy crosstalk between the collectors of Q1 54 and Q2 56 is minimized since the Miller capacitance of these transistors is connected to analog ground via the reference bias voltage 82 (BV$_2$).

In the "selected" mode operation of selectable input circuit 30A, bias control voltage 80 (BV$_1$), which is applied to the base of transistors Q5 50 and Q6 52, is less than bias voltage 82 (BV$_2$) applied to the base of grounded base amplifier transistors Q1 54 and Q2 56 (i.e. BV$_1$<BV$_2$). As such, the data pulse current from input resistors R1 58 and R2 60 will be steered through transistors Q1 54 and Q2 56 to the data regenerating flip-flop of transistors Q3 66 and Q4 68 of RZ to NRZ converter 32 via outputs 36 and 38, respectively. To steer the data pulse current through transistors Q1 54 and Q2 56 the difference between bias control voltage 80 (BV$_1$) and bias control voltage 82 (BV$_2$) may be as little as –200 mV. As a result of the operation of selectable input circuit 30A in the "selected" mode, the regenerating flip-flop of RZ to NRZ converter 32 will regenerate data in the RZ format to the NRZ format with the hysteresis control circuit (not shown) supplying a tail current to the flip-flop transistors Q3 66 and Q4 68. The hysteresis control of flip-flop transistors Q3 66 and Q4 68 may, for example, take the form of the hysteresis control circuits described in U.S. Pat. No. 5,852,637 issued to Brown et al.

When selectable input switch 30A is in the "selected mode" thereby steering a data pulse received from non-contact bus 21 through RZ to NRZ converter 32 and into data sink 16 via path 20, selectable input circuit 30B would be in the "not selected" mode. The reverse also applies. However, it is possible, and may also be desirable for both selectable input circuit 30A and 30B to be in the "not selected" mode, thereby transmitting no NRZ data pulse to data sink 16. The same to Bias Control Voltages$_{1,2}$ be used in reverse for the second selectable input circuit 30A (i.e. Bias Control Voltage$_1$ on the first input circuit would become Bias Control Voltage$_2$ for the second input circuit and Bias Control Voltage$_2$ on the first input circuit would become Bias Control Voltage$_1$ for the second input circuit). This arrangement ensures that at least one of the two data lines is selected if the absolute difference between the bias control voltages was greater than 200 mV. If the absolute difference between the bias control voltages is less than 200 mV than neither of the two data lines is selected. Alternatively, the bias control voltages could be controlled separately.

As noted in the incorporated references, RZ to NRZ converter 32 performs RZ to NRZ conversion of an input signal received from outputs 36 and 38 using flip-flop transistors Q3 66 and Q4 68 in combination with a hysteresis generating circuit. Both the input impedance terminating resistors R3 44 and R4 46 and the RZ to NRZ converter, such as RZ to NRZ converter 32, are not materially affected by the incorporation of selectable input circuit 30A.

Figure 4:
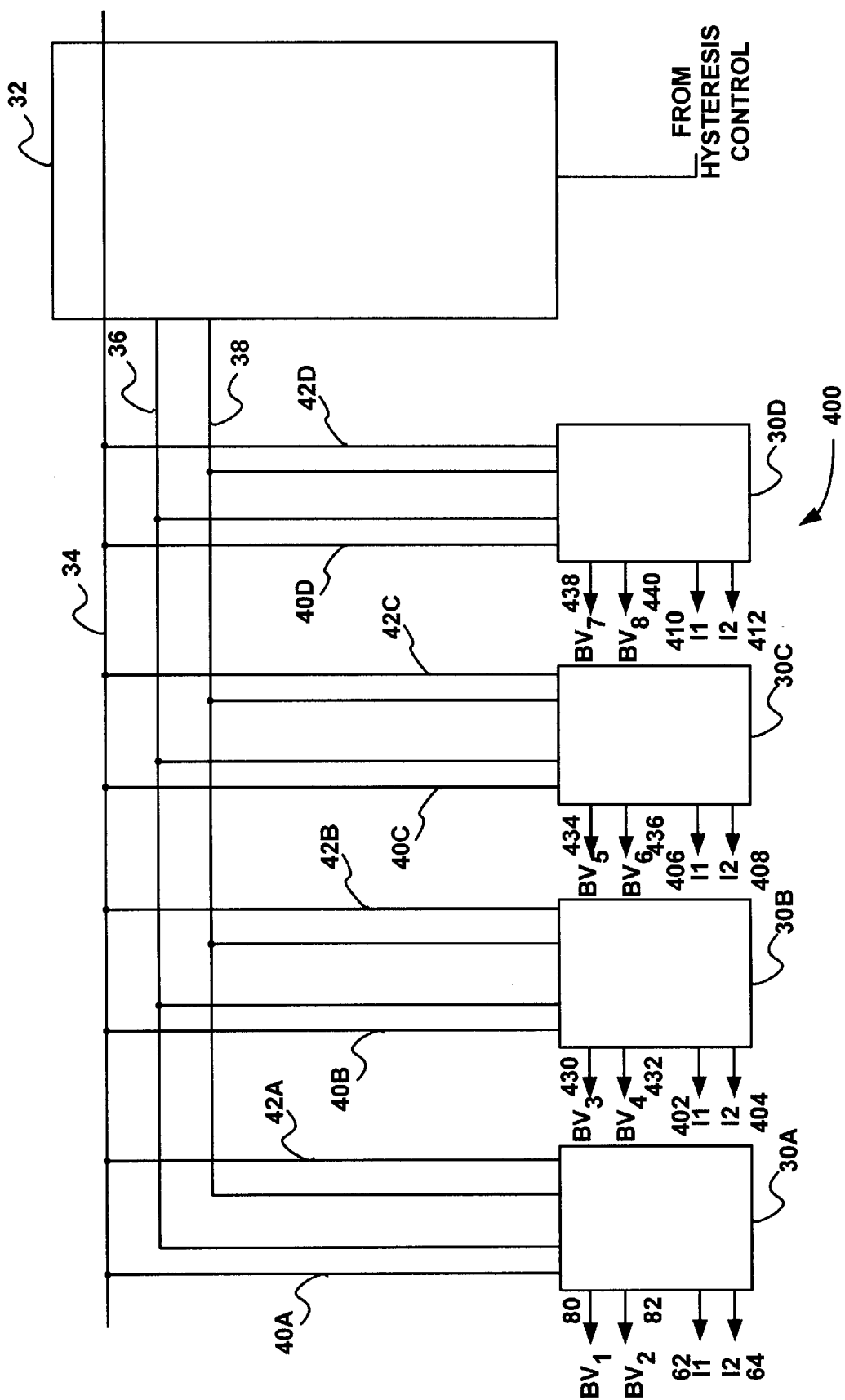
FIG. 4 is a schematic detail of a second embodiment of the invention.

As noted above, the selectable input circuit 30A, which is comprised of resistors R1 58 and R2 60, and transistors Q1 54, Q2 56, Q5 50 and Q6 52, may be replicated any number of times, but, due to practical limitations, is typically limited to four selectable input circuits in total. Such an embodiment is illustrated in FIG. 4. The embodiment illustrated in FIG. 4 permits the selection of one of four data lines 18 of backplane 12 (FIG. 1).

Selector switch 400 (FIG. 4) is comprised of four selectable input circuits 30A, 30B, 30C and 30D (collectively 30). The internal configuration of selectable input circuits 30A, 30B, 30C and 30D is identical to selectable input circuit 30A of FIG. 3.

Each selectable input circuit 30 has a differential input comprised of a first input (I$_1$) and a second input (I$_2$) and two bias control voltages (BV$_x$ and BV$_{x+1}$). Specifically, selectable input circuit 30A has first input 62 (I$_1$), second input 64 (I$_2$), bias control voltage 80 (BV$_1$) and bias control voltage 82 (BV$_2$). Selectable input circuit 30A is also in communication with power supply rail 34 via paths 40A and 42A and RZ to NRZ converter 32 via outputs 36 and 38. Similarly, selectable input circuit 30B has first input 402 (I$_1$), second input 404 (I$_2$), bias control voltage 430 (BV$_3$) and bias control voltage 432 (BV$_4$). Selectable input circuit 30B is also in communication with power supply rail 34 via paths 40B and 42B and RZ to NRZ converter 32 via outputs 36 and 38. Similarly, selectable input circuit 30C has first input (I$_1$) 406, second input 408 (I$_2$), bias control voltage 434 (BV$_5$) and bias control voltage 436 (BV$_6$). Selectable input circuit 30C is also in communication with power supply rail 34 via paths 40C and 42C and RZ to NRZ converter 32 via outputs 36 and 38. Similarly, selectable input circuit 30D has first input 410 (I$_1$), second input 412 (I$_2$), bias control voltage 5438 (BV$_7$) and bias control voltage 5440 (BV$_8$). Selectable input circuit 30D is also in communication with power supply rail 34 via paths 40D and 42D and RZ to NRZ converter 32 via outputs 36 and 38. As noted above, the physical location of the four selectable input circuits 30 is most effectively located on all four sides of the RZ to NRZ converter 32 (rather than in the serial fashion illustrated, for exemplary purposes only, in FIG. 4) thus keeping the path delays from all four inputs identical and minimal which is important in the context of subsequent clock/data timing alignment.

In operation, the embodiment of FIG. 4, the differential inputs (I$_1$ and I$_2$) of each selectable input circuit 30 is in communication with a data line, such as data line 18 (FIG. 1), by coupler 22 (FIG. 1). Assuming that data lines 18A, 18B, 18C and 18D are in communication with selectable input circuits 30A, 30B, 30C and 30D, respectively, a particular data line, data line 18B for example, is selected by ensuring that selectable input circuits 30A, 30C and 30D are in the "not selected" mode and 30B is the "selected" mode. In this configuration bias control voltages$_{1,5\ and\ 7}$ (80, 434 and 438, respectively) are greater than bias control voltages$_{2,6\ and\ 8}$ (82, 436 and 440 respectively). As such any signal received by selectable input circuits 30A, 30C or 30D will be steered by operation of transistors Q5 50 and Q6 52 (in the respective selectable circuits 30A, 30C and 30D) to power rail 34 via paths 40A, 40C, 40D, 42A, 42C and 42D.

Simultaneously with the operation of selectable input circuits 30A, 30C and 30D in the "not selected mode", bias control voltage$_3$ of selectable input circuit 30B will be less than bias control voltage$_4$ and thus selectable input circuit 30B will be in the "selected" mode of operation. The individual bias control voltages, used to select an input circuit could be controlled, for example, by signals from a switching processor circuit or the like. In the "selected" mode the differential input received on inputs (402 and 404, respectively) via data line 18B will be steered by operation of transistors Q1 54 and Q2 56 of selectable input circuit 30B via outputs 36, 38 to RZ to NRZ converter 32. The signal received by RZ to NRZ converter 32 will be converted from a RZ to NRZ format and the output 84 of converter 32 is then transmitted to data sink 16 via data path 20 (FIG. 1). Data sink 16 receives the data pulses transmitted from converter 32 and operates in a conventional manner.

While several embodiments of this invention have been illustrated in the accompanying drawings and described above, it will be evident to those skilled in the art that changes and modifications may be made therein without departing from the essence of this invention. All such modifications or variations are believed to be within the sphere and scope of the invention as defined by the claims appended hereto.

We claim:

1. A bit line selector switch, said bit line selector switch for interconnecting a plurality of backplane data lines, said backplane data lines for propagating data pulses, and a data sink, said bit line selector switch comprising:
   switch inputs in communication with a plurality of backplane data lines by a plurality of non-contact data line interconnects;
   a switch output in communication with a data sink;
   for each of said switch inputs, a selector circuit, said selector circuit interposed between said each of said switch inputs and said switch output and having a first mode of operation wherein data pulses detected by said selector circuit are blocked and a second mode wherein said data pulses detected by said selector circuit are transmitted;
   said selector circuit for each of said switch inputs matching the impedance of said data line interconnects in said first and said second modes; and
   a flip-flop circuit interposed between said switch output and a given selector circuit for a given switch input of said switch inputs wherein said flip-flop circuit receives said data pulse from said given selector circuit when said given selector circuit is in said second mode.

2. The selector switch of claim 1 wherein said flip-flop circuit is also in communication with a hysteresis controller.

3. The selector switch of claim 2 wherein said given switch input is a differential input.

4. The selector switch of claim 3 wherein said given selector circuit is comprised of:
   a pair of resistors matching the impedance of said data line interconnect and connected at one end to each side of said differential input.

5. The selector switch of claim 4 wherein each of said pair of matching resistors is connected at the other end to the emitters of a first and second selector transistor in parallel with each other, said first selector transistor's base is connected to a first bias control voltage and said second selector transistor's base is connected to a second bias control voltage, and the collector of said first selector transistor is connected to a positive supply and the collector of said second selector transistor is connected to said flip-flop circuit.

6. The selector switch of claim 5 wherein said flip-flop circuit and said hysteresis controller transform a received data pulse from a return to zero format to a non-return to zero format.

7. The selector switch of claim 6 wherein said flip-flop circuit is comprised of a first and second flip-flop transistor where said bases of said flip-flop transistors are connected to the collectors of said second selector transistors.

8. The selector switch of claim 7 wherein said selector circuit for each of said switch inputs is in communication with one of said plurality of data lines by a corresponding one of said data line interconnects.

9. A crossbar switch comprising:
   N backplane data lines for propagation of data pulses;
   N data coupling lines in non-contact communication with each of said N backplane data lines;
   a bit line selector system adapted to interconnect a data sink and said data coupling lines wherein said bit line selector system is operable to transmit said data pulses from a selected one of said N backplane data lines to a switch output and to simultaneously block said data pulses on the remaining N−1 data coupling lines, said bit line selector system including:
      a single first stage selector switch including:
         a plurality of inputs in communication with a second stage of selector switches; and
         a first stage output in communication with said switch output;
      said second stage of selector switches comprising:
         a plurality of outputs, forming a secondary backplane, in communication with a corresponding one of said inputs of said first stage selector switches; and
         a plurality of inputs in communication with said N data coupling lines;
      said first and second stage selector switches each operable in first and second modes;
      said first stage selector switches operable to select in said first mode from a selected one of said second stage selector switches and simultaneously operable in said second mode to not transmit data from the remaining ones of said second stage selector switches;
      said second stage switches each operable to uniquely select in said first mode one of said N data coupling lines and simultaneously operable in said second mode to not transmit data pulses propagating through the non-selected N−1 data coupling lines; and
      each of said first and second stage selector switches operable to match the impedance in either of said first or second mode of operation of lines connected to said inputs to said selector switches;
   said bit line selector system having N inputs corresponding to said N data coupling lines and said selector system has N/2÷1 selector switches;
   said switch output of said bit line selector system being in communication with said data sink; and
   said bit line selector system matching the impedance of said N data coupling lines whether transmitting said data pulses or blocking said data pulses;
   wherein each of said selector switches includes:
      two inputs;
      two selector circuits, each of said selector circuits connected to a different one of said two inputs;
      each of said two inputs is a differential input; and
      a converter converting said data pulses to an NRZ format in communication with said first stage output of said selector system.

10. The crossbar switch of claim 9, wherein each side of said differential inputs of said selector circuits is comprised of:

a resistor matching the impedance of said data coupling lines connected at one end to each side of said differential inputs;

a first and second grounded base amplifier connected in parallel via said amplifiers' emitters to the other end of said resistor;

said first grounded base amplifier connected at its base to a first bias reference voltage and at its collector to said converter;

said second grounded base amplifier connected at its base to a second bias reference voltage and at its collector to a positive supply;

whereby when said first bias reference voltage is greater than said second bias reference voltage said data pulses are transmitted to said positive supply and when said first bias reference voltage is less than said second bias reference voltage said data pulses are transmitted to said converter.

11. At a selector switch, a method of selecting one of a plurality of high throughput backplane data lines comprising:

selecting one of said backplane data lines to result in a selected backplane data line and a plurality of non-selected backplane data lines;

in a first mode of operation of said selector switch, transmitting a first plurality of data pulses received by said selector switch, said first plurality of data pulses received via a data coupling line in non-contact communication with said selected backplane data line, to a data sink;

in a second mode of operation of said selector switch, transmitting a second plurality of data pulses received by said selector switch, said second plurality of data pulses received via data coupling lines in non-contact communication with said non-selected backplane data lines, to a positive supply; and matching the impedance of said data coupling lines in non-contact communication with said backplane data lines in either said first mode of operation or said second mode of operation;

wherein said selector switch operates in both said first mode and said second mode simultaneously on different backplane data lines of said plurality of backplane data lines; and wherein said data pulses are transmitted through a grounded base amplifier in either said first mode or said second mode of operation of said selector switch.

12. The method of claim 11 wherein said data pulses in said first mode are transmitted through a first grounded base amplifier and said data pulses in said second mode are transmitted through a second grounded base amplifier.

13. The method of claim 12 wherein said matching is performed by selecting a resistor having a resistance substantially equal to the impedance of a given one of said data coupling lines.

14. The method of claim 13 wherein said first and second grounded base amplifiers are controlled by a first and second reference bias voltage.

* * * * *

UNITED STATES PATENT AND TRADEMARK OFFICE
CERTIFICATE OF CORRECTION

PATENT NO. : 6,751,217 B1
DATED : June 15, 2004
INVENTOR(S) : Brown et al.

It is certified that error appears in the above-identified patent and that said Letters Patent is hereby corrected as shown below:

Column 10,
Line 52, the words "selector system has N/2÷1 selector switches" should be -- selector system has N/2+1 selector switches --

Signed and Sealed this

Nineteenth Day of October, 2004

JON W. DUDAS
*Director of the United States Patent and Trademark Office*